United States Patent
Flores Xavier et al.

(10) Patent No.: US 8,850,463 B2
(45) Date of Patent: Sep. 30, 2014

(54) SYSTEM AND METHOD FOR CAPTURING PARAMETERS AND RECORDING EVENTS IN PORTABLE DEVICES WITH DIGITAL TELEVISION RECEIVER

(76) Inventors: Átila Leão Flores Xavier, Rio de Janeiro (BR); Paulo Vicente Dutra Da Silva Santos Valente, Rio de Janeiro (BR); Leonardo Gomes Franco, São Goncalo (BR); André Ricardo Dias, São Paulo (BR); Alexandre Crivellaro, São Paulo (BR); Márcio Franco Quelhas Alves, São Paulo (BR); Lucas Rogério De Freitas, Campinas (BR); Daniel Tost, Campinas (BR); Eduardo Seiti De Oliveira, Campinas (BR); Gustavo Cincoetti, Campinas (BR); Felipe De Melo Xavier, Campinas (BR); Bruno De André Mazzoco, Campinas (BR); Patricia De Freitas, Campinas (BR); Rodrigo Geraldi Carraro, Jaguariuna (BR); Adriana Keiko Kawai, Campinas (BR); Nickolas Seibel Butti, Indaiatuba (BR)

(*) Notice: Subject to any disclaimer, the term of this patent is extended or adjusted under 35 U.S.C. 154(b) by 0 days.

(21) Appl. No.: 12/981,623

(22) Filed: Dec. 30, 2010

(65) Prior Publication Data
US 2012/0174144 A1    Jul. 5, 2012

(51) Int. Cl.
H04H 9/00    (2006.01)
H04N 7/16    (2011.01)
(Continued)

(52) U.S. Cl.
CPC ..... *H04N 21/44222* (2013.01); *H04M 1/72552* (2013.01); *H04H 60/27* (2013.01); *H04W 4/14* (2013.01); *G06Q 10/107* (2013.01); *H04L 67/22* (2013.01); *H04N 5/44543* (2013.01); *H04N 21/41407* (2013.01); *H04H 60/31* (2013.01); *H04H 60/43* (2013.01); *H04H 60/44* (2013.01); *H04N 21/6582* (2013.01)
USPC ...... 725/9; 725/14; 725/39; 725/62; 709/206; 455/2.01; 455/3.06; 455/466

(58) Field of Classification Search
CPC ............ H04N 21/44222; H04N 21/6582; H04N 21/41407; H04N 5/44543; H04H 60/43; H04H 60/44; H04H 60/31; H04H 60/27; H04L 67/22; H04M 1/72552; H04W 4/14; G06Q 10/107
USPC ............ 725/9, 14, 39, 62; 709/206; 455/2.01, 455/3.06, 466
See application file for complete search history.

(56) References Cited

U.S. PATENT DOCUMENTS

| | | | |
|---|---|---|---|
| 8,006,270 B2 * | 8/2011 | Martini et al. | ........... 725/62 |
| 2002/0178441 A1 | 11/2002 | Hashimoto | |

(Continued)

*Primary Examiner* — Hoang-Vu A Nguyen-Ba (57) ABSTRACT

A system and method for capturing and recording parameters of events on portable devices with a digital television receiver, a method for remote configuration of service parameters for capturing and recording events on portable devices, as well as a portable device and server. More specifically, a system and method for capturing audience data, the method for remote configuration of audience data capture service, especially adapted for digital TV services on portable devices such as mobile phones, smartphones, and personal digital assistants, among others, that helps in remotely setting up the service. Another aspect of the present architecture is the fact that it is completely based on software, using only resources that are already present in portable devices with an embedded service.

54 Claims, 7 Drawing Sheets

(51) Int. Cl.
*H04H 60/21* (2008.01)
*H04H 40/00* (2008.01)
*H04N 21/442* (2011.01)
*H04M 1/725* (2006.01)
*H04H 60/27* (2008.01)
*H04W 4/14* (2009.01)
*H04L 29/08* (2006.01)
*H04N 21/414* (2011.01)
*H04H 60/31* (2008.01)
*H04H 60/43* (2008.01)
*H04H 60/44* (2008.01)
*H04N 21/658* (2011.01)
*G06F 3/00* (2006.01)
*G06F 15/16* (2006.01)
*G06Q 10/10* (2012.01)
*H04N 5/445* (2011.01)

(56) References Cited

U.S. PATENT DOCUMENTS

| | | |
|---|---|---|
| 2004/0137929 A1* | 7/2004 | Jones et al. .................. 455/517 |
| 2005/0204379 A1 | 9/2005 | Yamamori |
| 2008/0195912 A1* | 8/2008 | Mende et al. ................. 714/752 |
| 2009/0222848 A1* | 9/2009 | Ramaswamy .................... 725/9 |
| 2010/0099421 A1* | 4/2010 | Patel et al. .................... 455/450 |
| 2010/0120410 A1* | 5/2010 | Fan et al. ...................... 455/419 |
| 2011/0106946 A1* | 5/2011 | Bao et al. ...................... 709/225 |
| 2011/0223881 A1* | 9/2011 | Brok den et al. .......... 455/404.2 |

* cited by examiner

SYSTEM AND METHOD FOR CAPTURING PARAMETERS AND RECORDING EVENTS IN PORTABLE DEVICES WITH DIGITAL TELEVISION RECEIVER

FIELD OF THE INVENTION

The present invention relates to a system and method for capturing and recording parameters of events on portable devices with digital television receiver, a method for remote configuration of service parameters for capturing and recording events on portable devices, as well as portable device and server. More specifically, a system and method for capturing audience data, the method for remote configuration of audience data capture service, especially adapted for digital TV services on portable devices such as mobile phones, smartphones, personal digital assistants PDA, among others.

BACKGROUND OF THE INVENTION

The present invention is necessary due to the absence of a simple and effective solution in the digital TV field on portable devices. The prior art presents some solutions to capture audience data on portable devices, as shown below.

The patent document U.S. 60/749,443 published on Jun. 21, 2007, assignee: The Nielsen Company, disclosures a system and method for wireless measuring of devices for audio/visual (A/V). According to that document, an exemplary method provides the steps of receiving media content from a A/V source device, embedding a video overlay in media content wirelessly received and wireless transmitting media content and video overlay to a unit A/V wireless. The exemplary method receives, via a wireless connection, identification information for the hearing in response to the overlay video broadcast, and receives information from the behavior of audience through a wireless connection.

The document published in Chinese CN 101370129 Feb. 18, 2009, owner: Zhongwei Shixum Satellite Tech (CN), presents a system for collecting statistical and analytical data, as well as a method of implementing mobile TV audience data capture of mobile television and direct broadcast satellite television. The system and method include a data collection module, a data encoding module, a data transmission module, a data service center and a module for statistical analysis of data. The data collection module is in a user terminal receiver that essentially encodes the data collected to form a text file. The data encoding module is, respectively, in the service center and the user data receiving terminal for the transmission of the text file with data from data service center. The data service center is on the front of the mobile television or direct broadcast television satellite. The module for analysis and statistical analysis of data implements statistical analysis of audience data for an audience ranking. The system and method provided by this invention are able to automatically collect data from the receiving terminal of the user terminal and transmit the collected audience to the data service center via a data communication module and processes, and statistically analyze the data in service center for obtainment of accurate and comprehensive ranking data for television programs.

The Japanese document JP 2006352438 published on Dec. 28, 2006, owner: Casio Hitachi Mobile Comm Co aims to improve the accuracy of the survey audience rating of transmission for a mobile terminal and protect privacy. The document objects a receiving terminal that combines the information for the audience and transmits that information to a communication device on a network. This document increases the sample survey and thus the reliability of survey accuracy can be improved. Additionally, the receiving terminal displays the transmission choices as the user's participation in the survey of audience rating, receiving a transaction option that the user makes to choose from, keeping the information received from the user and allows a means to gather the audience data collection and a transmission means to transmit the data only when the information indicates the operation of choice user participation in the audience survey classification. Still, the privacy of the user who does not want to participate in the survey can be protected.

The document U.S. Ser. No. 11/075,711 published on Sep. 15, 2005, owner: NTT DoCoMo, Inc. claims a mobile terminal comprising: a) receiving means, 2) means for reproducing the signal, 3) means for measuring the signal level, 4) means for generating information to generate a information, 5) means for transmitting information to transmit the information generated by the means for generating information.

The document U.S. Ser. No. 10/079,435 published on Nov. 28, 2002, owner: Minoru Hashimoto, refers to a system and method for audience research. The method proposed by this document comprises the steps of acquiring the user identification through the communication network and determining the audience ranking based on the acquired identifications.

According to the above proposals, the prior art solutions that use other modules in the architecture to help obtain audience data, usually traveling information through the conventional mobile data networks such as 2G and 3G networks.

The approach that these proposals bring does not provide specific contributions in the area of application of the present invention. Although in some of the documents is implicitly mentioned the possibility of using the SMS channel to exchange messages between the data capture device and the server that processes the data, it is not dealt with the merits of how such messages are built, encapsulated, sent or received, nor to which class they belong.

The approach of the present invention employs an efficient method of using the SMS channel of communication, beyond their conventional standard usage and defined in the standard conventional technique.

As previously mentioned, the presented prior art solutions make a simple extrapolation of what is known in the area of audience data capture systems "wired" to the "wireless" environment. In the context of wireless systems, known solutions focus on using the Internet, which means, in practice, using the mobile data network. However, this solution, which is technically obvious, is not within the scope of the present invention, since it does not satisfy the requirement that the portable device may be captured at any time and in real time to logical reach of the server.

Another difference that is not explored in any document of the prior art, is the possibility that the server can remotely configure the capture portable device. This feature is only technically feasible from the implementation presented in present invention.

BRIEF DESCRIPTION OF THE INVENTION

The present invention shows a simple, robust and functional. solution for audience data capture of mobile digital television A primary object of the present invention is to provide a system comprising a portable device connected to the mobile network which collects use events of the digital television and a server, which processes information received from said portable device and can generate reports of audience data and that, in turn, can remotely configure the portable device.

A second object of the invention is to enable the exchange of information between the said portable device and said server, in which sending information from mobile device to the server is done via SMS Class 2, and the receipt of information by the portable device originating from server is done via SMS Class 0, having a receiving port previously defined in the system.

A third object of the invention is to provide a method to capture parameters and record events on portable devices with digital television receiver comprising obtaining user information such as name and location, as well as information about intensity of TV signal, physical and logical channels at the time of the event collection and access information to electronic program guide (EPG) or search for channels, for sending the events encapsulated in an SMS message class 2 to said server transparently to the user's portable device.

Another object of the invention is to provide a method for remote configuration of service parameters capture and registration of events on portable devices, in which class 0 SMS with predefined port, are sent to portable devices to enable the service of capturing audience data or change SMS address of the server, for example.

Other solutions for the same purpose have been proposed. However, the following features that distinguish the present invention clearly advance the existing state of the art:

The use of a widely used service, safe and fast: the Short Message Service (SMS—Short Message Service) for traffic information;

The development of a new binary protocol for sending and receiving information that minimizes the amount of information traffic;

The use of all resources of the portable device to do a full analysis of audience data (user's location, the tuned channel, time of the audience, user information such as age, gender, profile, intensity of TV signal, among other fields);

The possibility of remote configuration of devices that capture the audience data and specific features on the server that processes the audience data.

Another important aspect of the present invention is that the architecture is completely based on software, using only the resources that are already present in portable devices with embedded service.

Technical Advantages/Functional of the Invention

The present invention shows some points that are important to the uniqueness of the solution. These points make the solution more robust, simple and at the same time, integrated with a variety of resources in terms of user and administrator. Here, some advantages of the present invention are presented:

It is integrated into the portable software and it is not necessary any installation or configuration of software;

It is instantaneous, and you can follow up with a delay close to zero, all users who are connected or not and their respective channels tuned;

It does not use text protocol for sending data collection, which makes the application more secure. A specific protocol has been specially designed to optimize the sending of messages with the data collected more efficient in the transmission due to the fact that it does not waste the user bandwidth;

It uses class 2 SMS messages to send data from the capture device to the server and class 0 SMS messages with a port previously defined by the system for remote configuration for sending data from server to capture device, as discussed below. With this strategy, the sending/receiving information in this system is totally transparent to the user.

It uses SMS messages, which makes charging for the service simple, reduces cost and optimizes the speed at no cost to the network.

It measures not only the audience but also the number of users with the TV on, how long and at what time;

It also measures the intensity of TV signal, which supports, for example, operators to evaluate the quality of TV signal in certain regions;

It also measures access to the TV program guide (EPG);

It records how many channels were obtained from a search of channels, which channels are obtained, the time of the channel search, the user and date;

It provides extensive flexibility in configuration of the audience measurement server, making it easy to map the statistical data by area, period, time and movement;

It allows easy remote configuration, since all service maintenance and activation of capture audience data service is transparent to the end user, and is done via software.

DETAILED DESCRIPTION OF INVENTION

Figure 1:
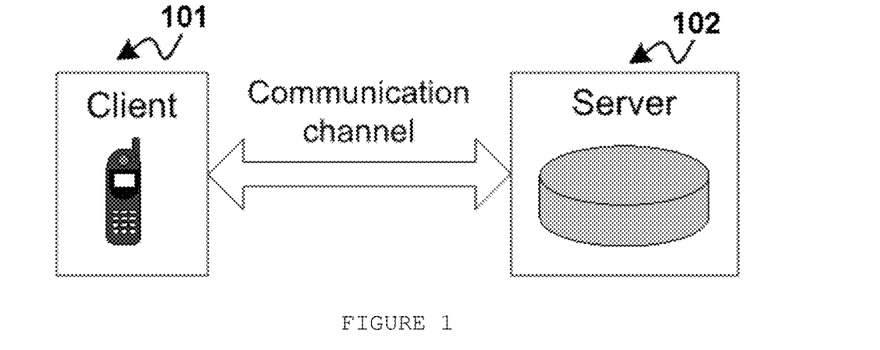
FIG. 1 shows the overview of the system to capture audience data, according to the preferred embodiment of the present invention.

The objects and advantages of the present invention will become apparent from the following detailed description of an example implementation of the invention and attached drawings by way of non-limiting example, in which:

FIG. 1 shows the client system as a portable device 101 connected to the mobile network that collects use events of the digital television on the portable device, a communication channel and a data server 102, which processes information received from the client, generating reports on audience data and, in turn, being able remotely configure the client portable device 101.

Figure 2:
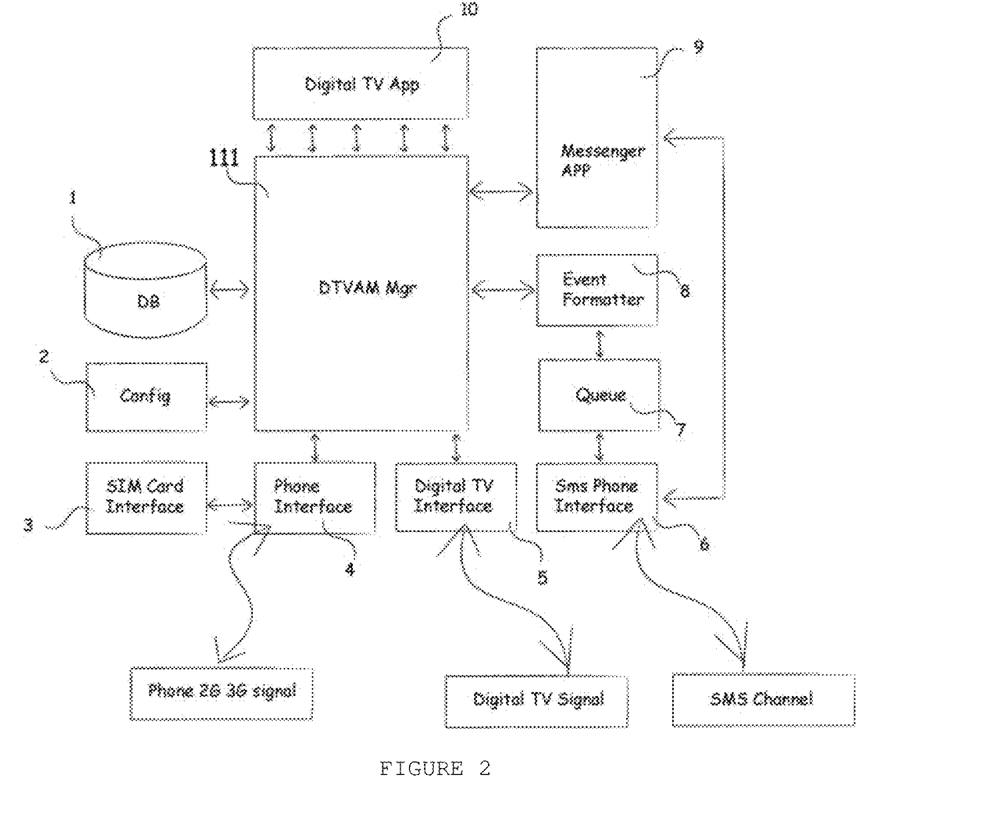
FIG. 2 shows the overall architecture of the client system to capture audience data, according to the preferred embodiment of the present invention.

FIG. 2 shows, in general, the architecture designed for the client system 101 for capturing audience data. Each of the components shown is a different software component, and each one by itself, provides a set of Application Programming Interfaces (API) so that together they form the service as a whole.

According to the present invention, the SMS channel, existing in GSM networks, is used to facilitate the exchange of information between a portable device 101 and a server 102, and sending information from the portable device 101 to the server 102 made via SMS Class 2 and receiving the information by portable device 101 coming from the server 102 done through SMS Class 0, having a receiving port previously defined in the system.

A class 0 SMS is used to configure a server to demand the key parameters for capturing audience data on the portable device 101. This configuration occurs transparently to the user in real time.

As depicted in FIG. 2, the main component of this system is the manager Mgr DTVAM 111. This DTVAM Mgr manager 111 is the entity that manages and processes the logic of receiving, transmitting and validating events generated and received by service as a whole within the portable device 101. The manager analyzes not only the arrival of TV events of the application, but also calls for data to all other components to enable the assembly of the message for sending, checking whether the event is valid for the validation algorithms and still starting or finishing all other components within the service.

The first component is a database, implemented in file, which includes a queue of events to be sent to the server. According to the preferred embodiment of the invention, for security and integrity of the system, each and every event is always validated by the service previously stored in a database. The sending of events occurs when the number of bytes in which event information is packaged are near, but does not exceed 140 bytes, or upon reaching a timeout, which is originally set to 10 minutes, according to preferred embodiment of the invention. Once events are sent to the server 102 and the latter confirms that the data arrived intact, such data is discarded from said database.

The second component is the interface where the configuration parameters of the service is, in which all the preference parameters for both the end user and the service are configured. It is a fairly simple component that includes settings in nonvolatile memory for future launches due to battery loss or shutdown of the portable device 101.

The third component is the SIM card interface present in the application programming interfaces basic to portable device 101. Through said component 3, it is possible to obtain the user information on the SIM card (ICCID) and insert it into the event to be sent to the server 102. With this information the server 102 then compares the ICCID with a detailed user registration (generally validated the purchase of portable device 101). Thus, it is possible to determine in the server 102, a huge variety of individual characteristics in order to generate multiple combinations of reports.

The component 4 is the interface of the portable device 101, in which it is obtained the location information of the user in the time of the event computed in the service. Said interface 4 is used to get the country code of the cell (MCC), the code of the mobile network (MNC) and network identifier (Cell ID), in which the user was registered at collection event. Thus, with reasonable accuracy, it is possible to obtain the user's location and the region at the time of collection. This information may be required for reporting by region of interest to the mobile operator, for example.

The component 5 is the TV circuit interface of the portable device. With this interface, it is possible to collect the signal of TV channels as well as the physical and logical channels at the time of collection event. Still, it is possible to obtain information such as access to electronic program guide (EPG) or search for channels. Such TV circuit interface 5 provides the following information:

User answered "YES" in the activation message of the system;
User answered "NEVER" in the activation message of the system;
User activated the system through an invitation message for activation;
User activated via the menu system;
TV is turned off (it means focus loss);
TV is turned on (meaning focus gain);
Changing Channels—beginning the search of channels;
TV is tuned;
TV is not tuned;
Loss of TV signal;
Recovery of TV signal;
Results of searching channels;
Access to electronic program guide (EPG);
Exit of the electronic program guide (EPG);
Recognition of remote configuration;
Event of starting an incoming call, and
Event of ending an incoming call.

The component 6 is the SMS interface for the portable device, known as TAPI (Telephone API). By means of this interface 6, the device can send and receive SMS messages. In the case of sending messages to the server, the SMS messages are of type class 2. For receiving messages from the Server, SMS messages are of the class 0, with a port previously defined in the system. It should be note that the port previously defined by the system cannot be any port defined by default for the GSM standard SMS channel.

The queuing means 7 serves to store the events received in a queue ordered by event date in order to optimize the sending of SMS messages to the portable device 101. For performance reasons, this component keeps the information active in the volatile memory of the portable device 101. Periodically, the component 7 sends to said component 1 the current queue of events to be stored in file serving for redundancy in case of any failures.

The component 8 is a means for formatting events so that they are passed to the queue and then are sent by the SMS channel. This component encapsulates the events so that they are consistent with the protocol DTVAM-DS which will be detailed in FIG. 3.

The component 9 is the means of implementation of SMS and MMS messages (Multimedia Messaging Service) embedded in the portable device 101. This application is modified to be able to receive and process commands from the server on a specific port. These commands are forwarded to said manager DTVAM Mgr 111 that processes and executes the request. Said application 9 is responsible for processing the SMS invitation coming from the server 102, showing a special interface for the user when reading the invitation. Special menus are added to the reading panel so that the user can directly accept service for capturing audience data using the application 9, without going into the TV application.

The component 10 is the application of the TV itself. By means of this component 10, the events are generated and passed on to that manager 111. Said manager 111 processes and validates if the event is suitable for registration or for disposal. The TV application can also display periodically pop-ups inviting users to participate in the service for capturing data audience. There is a specific menu so that the user can interact when he wants and enable or disable the service for data capture.

Figure 3:
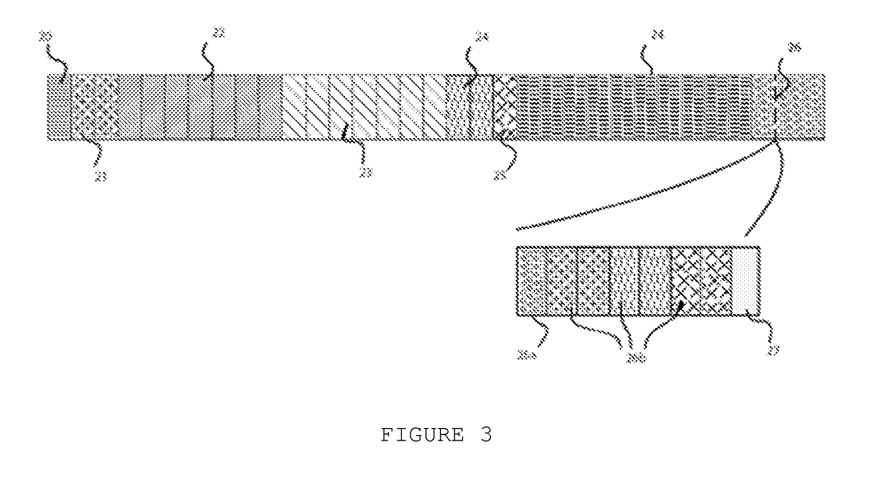
FIG. 3 shows the communication protocol of the traffic on SMS (SMS Class 2, sent from the portable device to the server) of audience data, herein called DTVAM-DS protocol, according to the preferred embodiment of the present invention.
Figure 4:
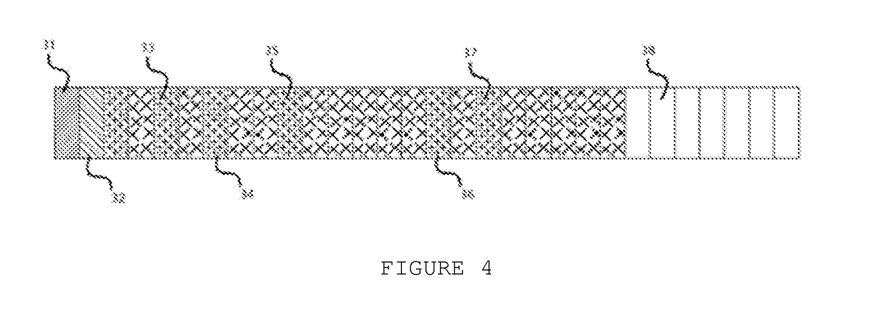
FIG. 4 shows the communication protocol of the traffic on SMS (class 0 SMS to specific port previously defined by the system, sent by the server to the portable device) of configuration parameters and special messages of invitation, herein called DTVAM-SD protocol, according to the preferred embodiment of the present invention.

FIGS. 3 and 4 show one of the different aspects of the solution of the present invention which is the protocol used to encapsulate the data collected from the TV application within a SMS message. These SMS messages are sent to specific ports, determined by the server, with the restriction that such ports are not already specified by the standard SMS. These SMS messages are sent as Class 2, are concatenated and, according to the preferred embodiment of the invention, they do not require confirmation of arrival at the server 102. They use data bytes available to send the SMS message encoded in 8 bits and are sent in binary form, not in text form, as usual.

In FIG. 3, we can represent the useful area of SMS data as the whole train of bytes represented. It will be specified each of the components from left to right, where each small rectangle represents one byte:

The component 20 is a sequence number added to the event so that the server can track whether a SMS message is being lost during transmission. It goes from 0 to 255 and is cyclical.

The component 21 represents the ID of the event being sent. A bit mask is applied for recognition.

The component 22 represents the event date collected, with priority to the network time and if not available, the time of the portable device. The mode of representation is 2 characters per byte.

The component 23 represents fields MCC+MNC+Cell ID, respectively, represented in two characters per byte.

The component 24 represents, respectively, the physical and logical channels, representing, respectively, the frequency of the channel and the channel number assigned at the time of collection.

The component 25 represents the strength of TV signal at the time of collection of the event. The component 26 represents channels obtained from a channel search and is optional. This information is only sent in case of searching channels. In the case of sending it, as expanded in 26 a and b, the first byte is how many channels were obtained from the search, being cut at 20. Thereafter, the channels are represented by two bytes, one byte for the physical channel and a channel to the logical channel.

Once an event ends, another is attached to the end to maximize space in the SMS data. According to the preferred embodiment of the invention, if an event does not fit at the end of the SMS message so that it has to be broken, the whole event then moves to the next message. The current message is then sent with a small "surplus" in the data field.

In the case of network failure, the events are stored on disk, and as soon as the portable device is registered again on a network, all events accumulated are sent to the server.

FIG. 4, further describing the protocol here called DTA-VAM-SD protocol, shows the data field of the SMS message for configuration coming from the server for the devices. This SMS message can contain one or a plurality of commands at a time, and all are processed at once when they reach the portable device. This SMS is a SMS class 0, unique, having 16-bit port address and is also not concatenated. FIG. 4 also shows the field data as in FIG. 3 and each small rectangle represents one byte.

Starting with the reference number 31, the field represents the number of configuration messages in the message SMS, followed by sequence number to track the message if no text message was lost on the path represented by 32.

Thereafter, all fields marked with standard "cross" represents the command code in question, followed by the fields marked with standard "in x" representing the command data. The main commands, according to the preferred embodiment of the invention are described below:

00—Command to change the number of times that the TV application is initialized before the invitation pop-ups begin to appear at startup;

01—Turns on or off the system remotely, if it has already been activated by the user;

02—Change the time to validate a particular type of event, the event being represented by 1 byte of the type of event and one byte for the new value;

03—Change the address of the SMS server. It is represented by two numbers per byte;

04—Change the time of accumulation of events in the queue before shooting SMS messages with the events to the server.

Figure 5:
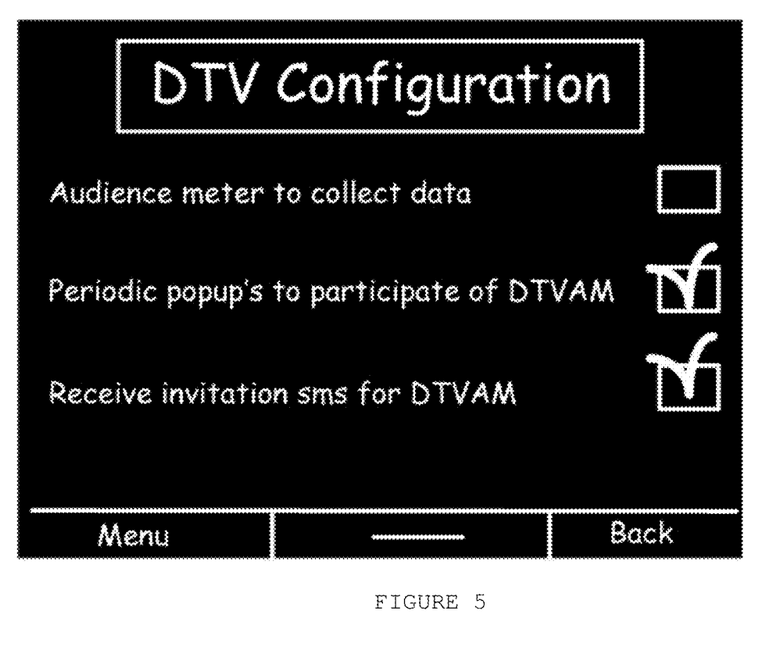
FIG. 5 shows an exemplary graphical user interface for configuration of audience data capture service embedded in the in TV application, according to the preferred embodiment of the present invention.

05—This is SMS message invitation, represented by the first byte to the size of the message followed by the message itself;

FIG. 5 shows, in a simple way, a graphical user interface, according to the preferred embodiment of the invention, the configuration menu on the TV application on the portable device. From this screen, it is possible to preserve user privacy, if he wishes to disable the service, for example, or change any other parameters available.

Figure 6:
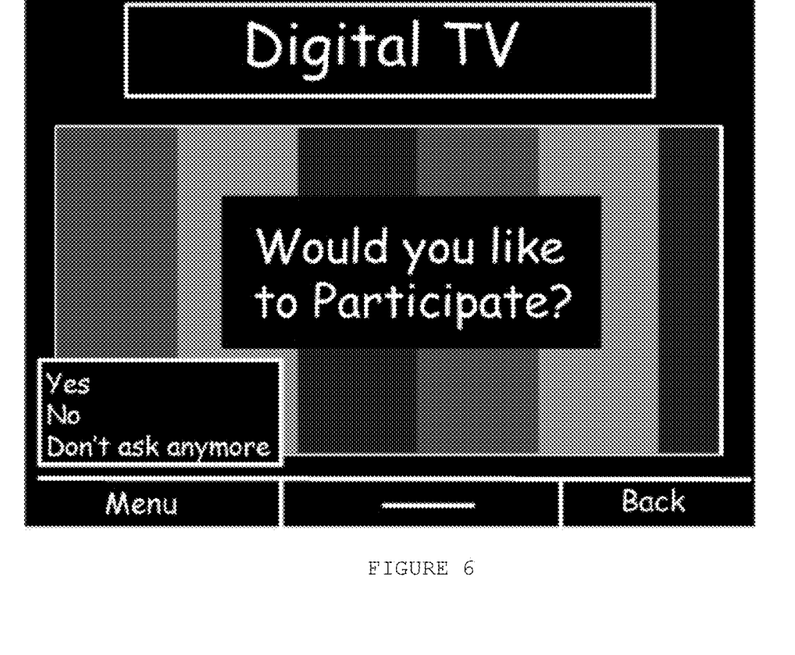
FIG. 6 shows an exemplary graphical user interface for startup of the TV application inviting users to participate in the service, according to the preferred embodiment of the present invention.

FIG. 6 shows an exemplary graphical user interface for the startup of the TV application inviting users to participate in the service, according to the preferred embodiment of the present invention. From this interface, the user is enabled to choose to participate or not in service.

Figure 7:
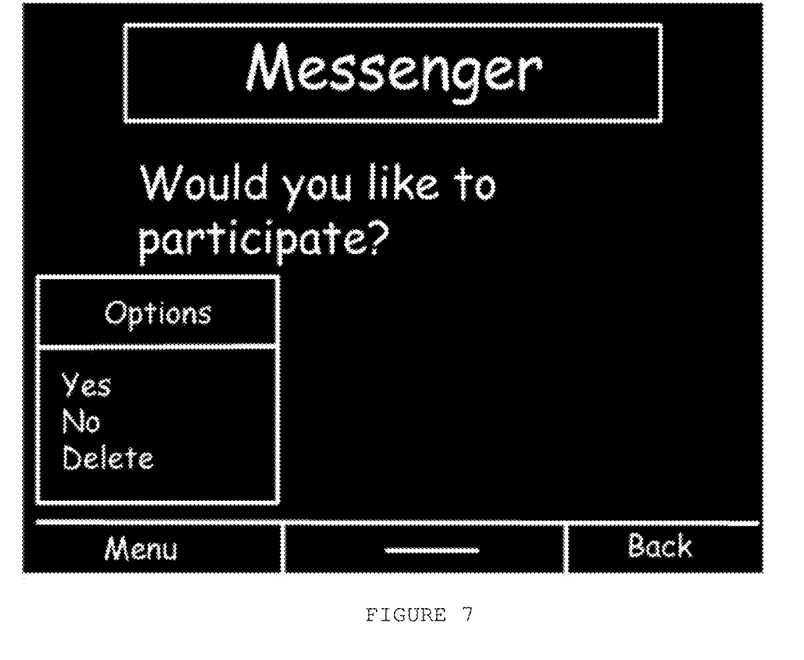
FIG. 7 shows an exemplary graphical user interface for the custom menu in the application of the Messenger message that detects special invitation and direct option for use in the program for capturing parameters, according to the preferred embodiment of the present invention.

FIG. 7 shows an exemplary graphical user interface for the custom menu that detects invitation messages and direct option to use the service, according to the preferred embodiment of the present invention. This screen of the SMS Application of the portable device 101 shows a invitation text message to the user with service options to capture audience data direct from application 9.

Figure 8:
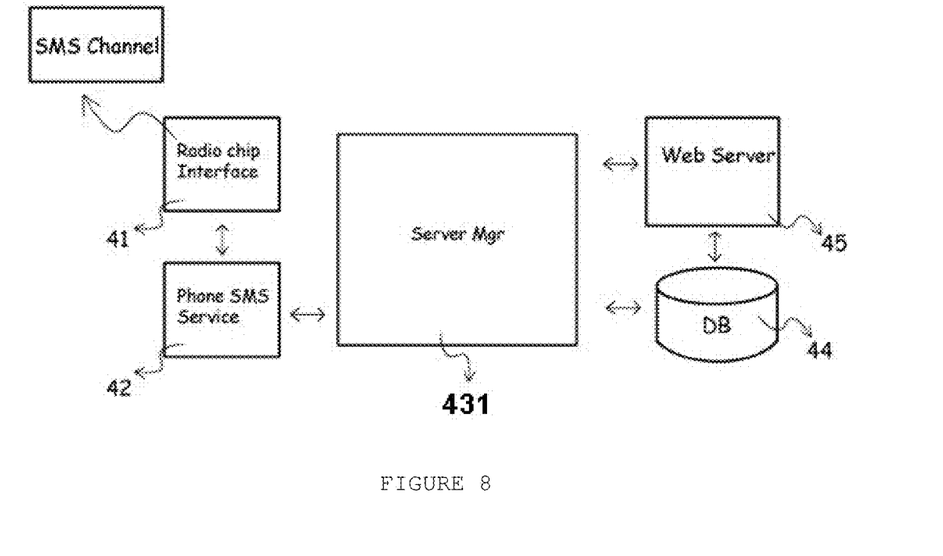
FIG. 8 is shows the general architecture of the system server to capture audience data, according to the preferred embodiment of the present invention.

FIG. 8 shows the architecture of the server to receive the events generated in portable devices with the service for data capture audience enabled.

The server manager 431 is the interface that receives information from the records and events captured by the portable device 101. This information is processed and consolidated by that manager to obtain the desired audience data. This manager 431 also conducts management of the activity of remote configuration of service parameters and capture records of events on the portable device 101. In addition, the item 431 is able to cross all the events databases, process requests for graphics and still refer to the Web Server that needs to provide this data in an organized way in the final reports. The manager 431 can cross the ICCID user information, and save in the events database the full range of user information saved in the database of previously registered users.

Item 41 represents the physical interface of the radio channel through which the server exchanges SMS messages with the portable device 101.

Item 42 is the interface of SMS that in case of receiving an SMS Class 2 from the portable device 101, it validates the integrity of the data and forwards it to the server manager 431. In the case of sending an SMS class 0 message to the portable device 101, item 42 validates the information generated by the server manager 431 and packages it according to the DTVAM-SD protocol defined in FIG. 4.

Item 44 is a relational database capable of managing all data event captured by the manager 431 and saved in the same. 44 This database was designed so to be able to mount various types of graphs later as demanded by the service administrator.

Item 45 is a Web server capable of processing data from the database 44 and display them, then, in the form of graphs.

According to the preferred embodiment of the present invention, the sending of an SMS server 102 to the portable device 101 is outlined as follows: the server 102 sends a class 0SMS, with port previously defined for the aforementioned portable device 101, in which that interface 6 receives the SMS text message and checks the class and port. If the SMS message is Class 0 and the port is that previously defined in the system, then the information is passed to the mentioned manager 111 so that the capture parameters of the audience data are configured. It is important to indicate that in the display screen of the portable device, it will not be presented any information about this setting and the user will not have to take any additional action for this configuration is performed. Using this approach, you can perform the following operations:

Changing the value to show the activation message;
changing state of activation of the service for capturing audience data;
changing timeout to detect events in a specific category;
changing SMS address of the server 102;
changing the value of accumulation period of system events, and
showing invitation message for activating the service data capture audience.

Figure 9:
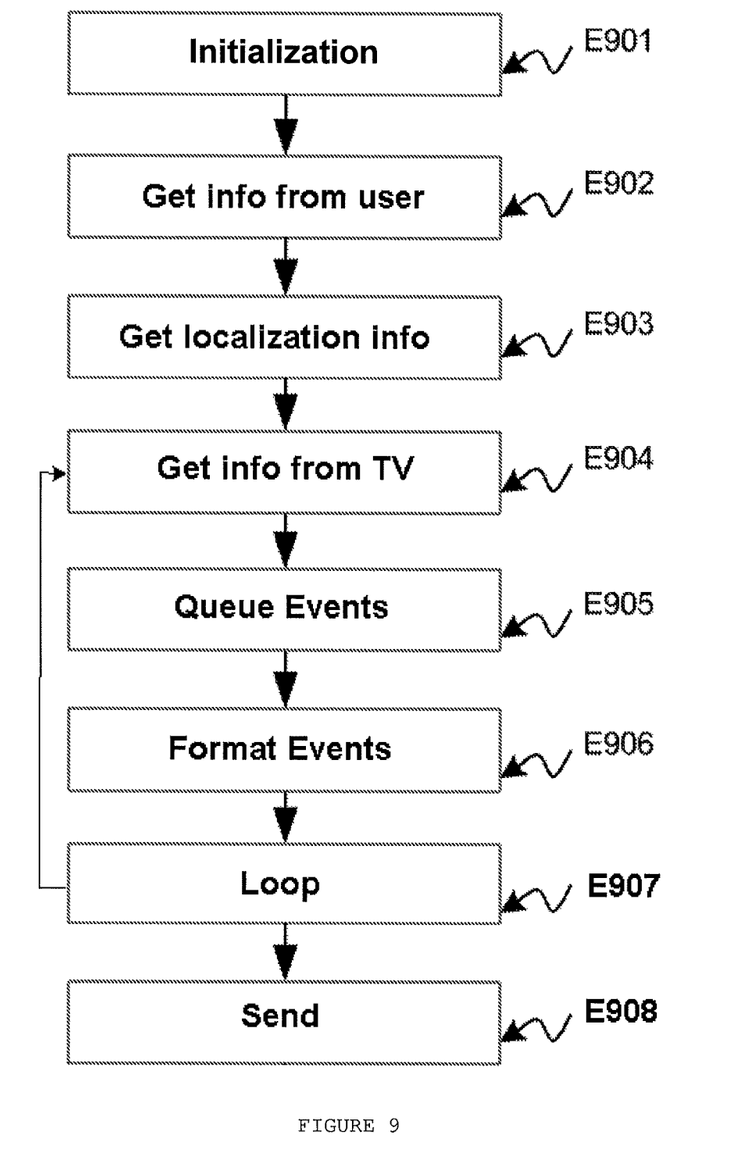
FIG. 9 shows the flowchart of the method of sending data from the capture portable device to the server in the preferred embodiment of the present invention.

FIG. 9 shows the method for capturing and sending audience data of digital television viewing on portable devices comprising the following steps:

Initializing the service of capturing parameters and register events on the portable device 101 (Step E901);
providing the user's information in the SIM card (ICCID) and insert the same in the event to be sent to the server, allowing the server to later compare the ICCID with a detailed record of the user (Step E902);
obtaining the location information of the user in the time for the event computed in the service (Step E903);
Collecting information about the intensity of TV signal, physical and logical channels at the time of the event collection and information access to electronic program guide (EPG) or searching for channels (step E904);
Storing the received events in a queue ordered by event date (Step E905);
Formatting the events to be saved in the queue for sending by encapsulating the events in accordance with the protocol DTVAM-DS (Step E906);
Repeating the steps E904 to E906 until the maximum size of 140 bytes of an SMS is reached or exceed the timeout of 10 minutes (Step E907); and
Sending events encapsulated in an SMS class 2 message to the server 102 transparent to the user's portable device 101 (Step E908).

Figure 10:
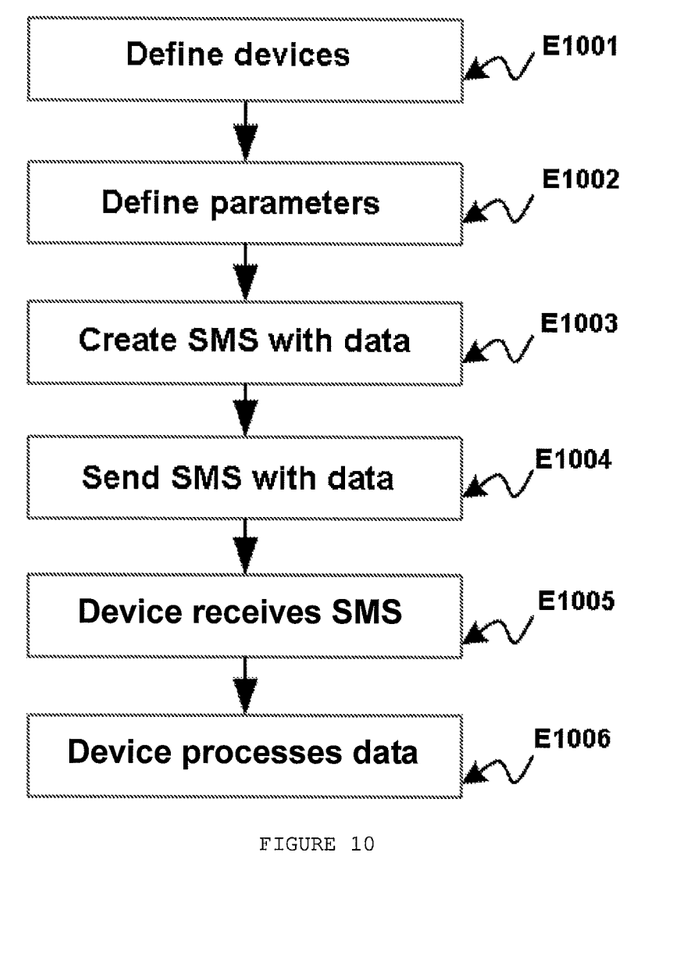
FIG. 10 shows the flowchart of the method of sending data from server to capture portable device according to the preferred embodiment of the present invention.

FIG. 10 shows the method of remote configuration of the service to capture and record events in portable device comprising the following steps:

Setting the portable devices (101) that will receive the setup message by means of the manager (431) (Step E1001);
Defining the parameters that are set on the portable devices (101) through the manager (431) (Step E1002);
Assembling SMS Class 0 messages with pre-defined port by the system, according to the protocol DTVAM-SD, which will be sent to portable devices (101) (Step E1003);
Sending messages from the server (102) to the portable device (101) (Step E1004);
Receiving the configuration server (102) on the portable device (101) on a specific port defined by the system (Step E1005) and
Processing the contents of the SMS in the portable device (101) and generate a set of actions to be performed by the manager (111) (Step E1006).

According to the method of the present invention, these specific actions sent by the server manager 431 are included in the group comprising:

changing the value for displaying the activation message;
changing activation state of service for capturing audience data;
changing the timeout to detect events in a specific category;
changing SMS address of the server 102;
changing the value of accumulation period of system events, and
showing invitation message for activating the service for capturing audience data.

Although a preferred embodiment of the present invention is shown and described, those skilled in the technical will understand that various modifications can be made without departing from the spirit and scope of the present invention, as defined in the appended claims.

It is also expressly stated that all combinations of elements that perform the same function in substantially the same way to achieve the same results are within the scope of the present invention.

The invention claimed is:

1. A system for capturing parameters and recording events on a portable device with a digital television receiver, the system comprising:
a manager that manages and processes the logic of receiving, transmitting and validating events generated by a service and received within the portable device, analyzing an event arrival, requesting data on all components to enable the assembly of the message to be sent, checking if the event is valid and initializing or ending all other components within the service for capturing events;
a database which includes an event queue to be sent to a server;
an interface for configuration of service parameters, in which all the preference parameters for both the end user and the service are configured;
a SIM card interface to obtain user information on a SIM card (ICCID) and inserting the same in the event to be sent to the server;
an interface of the portable device, through which it is obtained the location information of a user at the time for the event computed in the service;
an interface TV circuit of the portable device to collect information about the intensity of TV signal, the physical and logical channels at the time of collection of event information, as well as access to electronic program guide (EPG) or search for channels;
an SMS interface of the portable device in a port defined by the server, to send the events encapsulated in an SMS message to the server and receiving events for the configuration service for capturing parameters and registering events;
a queue to store the events received in a queue ordered by event date;
a formatter to format events to be saved in the queue to be sent by SMS channel, the events being encapsulated in accordance with the protocol DTVAM-DS;
an interface for application of SMS and MMS embedded in the portable device to receive and process commands from the server on a particular port, these commands being passed to the manager that processes and executes the commands remotely;
an event processor for TV application, in which events are generated and forwarded to the manager that processes and validates whether an event is suitable for registration or for disposal;
a manager in the server to receive the information records and events captured by the portable device and performs the management of the activity of remote configuration of service for capturing parameters and recording events in the portable device;
a radio channel interface through which the server exchange SMS messages with the portable device;
an SMS interface embedded into the server that validates the integrity of data and forwards the same to the manager;
a relational database capable of managing all event data captured by the manager and saved in the same, and
a Web Server to process the data of the database, such information and records of events being captured processed and consolidated by the manager to obtain desired audience data,
wherein, as events are sent to the server and the server confirms that the data arrived intact, these data are excluded from the database.

2. The system of claim 1, wherein each and every event is always validated by the service previously stored in the database.

3. The system of claim 1, wherein the sending of events occurs when the number of bytes in which event information is packaged is near, but not greater than 140 bytes or a timing timeout limit.

4. The system of claim 3, wherein the timeout limit is set to 10 minutes.

5. The system of claim 1, wherein the interface of the portable device is used to obtain the phone country code (MCC) of the mobile network code (MNC) and the network identifier (Cell ID), in which the user was registered at the time of collection of the event, providing the user's location and the region at the time of collection.

6. The system of claim 1, wherein the TV circuit interface provides the following information:
the user answered "YES" in an activation message of the system;
the user answered "NEVER" in the activation message of the system;
the user activated the system through an invitation message for activation;
the user activated a menu system;
the TV is turned off;
the TV is turned on;
a channel is changed or a search of channels is initiated;
the TV is tuned;
the TV is not tuned;
the TV signal is lost;
the TV signal is recovered;
Results of searching channels is displayed;
the electronic program guide (EPG) is accessed;
the electronic program guide (EPG) is exited;
remote configuration is recognized;
an incoming call is initiated, and
an incoming call is terminated.

7. The system of claim 1, wherein the server sends an SMS class 0 message with a port previously defined, and the interface SMS of the Portable device that receives the SMS message, checks the class and port, if it is class 0 and the port is predefined in the system, then the information is passed to the manager so that the parameters for capturing audience data are configured.

8. The system of claim 1, wherein the configuration parameters of data capture audience comprises:
changing a value to show an activation message;
changing state of activation of the service for capturing audience data;
changing timeout to detect events in a specific category;
changing SMS address of the server; and
changing the value of accumulation period of system events.

9. The system of claim 1, wherein the queue sends to the database the current queue of events to be stored in file serving for redundancy in case of failures.

10. The system of claim 1, wherein the interface of application of SMS and MMS is responsible for processing the invitation SMS messages coming from the server, and showing a special interface to the user when reading the invitation.

11. The system of claim 1, wherein special menus are added to a reading panel so that the user can accept direct from the manager for applying the service of capturing audience data without entering the TV application.

12. The system of claim 1, wherein the interface for TV application can also periodically show pop-ups inviting users to participate in the service for capturing audience data.

13. The system of claim 1, wherein a specific menu is provided so that the user can interact when he wants, and that enables or disables the service for data capture.

14. The system of claim 1, wherein such data collected through the TV application are encapsulated within SMS messages sent, and these SMS messages sent to specific ports, determined by the server, with the restriction that those ports are not already specified by standard SMS protocol.

15. The system of claim 14, wherein these messages are sent as Class 2 SMS, are not concatenated, and do not require confirmation of arrival at the server.

16. The system of claim 14, wherein these SMS messages using the bytes of data available on SMS for sending coded in 8 bits and are sent in binary form.

17. The system of claim 14, wherein these SMS messages are not sent in text form.

18. The system of claim 1, wherein once an event ends, another is attached to the end of the SMS message to maximize data space in the SMS message.

19. The system of claim 1, wherein if an event does not fit the end of the SMS message so that it has to be broken, the whole event then moves to the next SMS message, and the current SMS message is sent with a surplus in the data field.

20. The system of claim 1, wherein in the event of network failure, the events are stored on disk, until the portable device is registered on a network again, all events are sent to the server.

21. The system of claim 1, wherein the SMS message from the server configuration to the portable device comprises one or a plurality of commands at a time, and all are processed at once when they reach the portable device.

22. The system of claim 1, wherein the SMS message coming from the server is a class 0 SMS, unique, addressing 16-bit port and is not concatenated, and ports are configured as a client, as in SMS message for sending, class 2.

23. The system of claim 1, wherein in the case of sending an SMS class 0 message to the portable device, the interface SMS embedded onto the server validates the information generated by the manager and following protocol package DTVAM-DS.

24. The system of claim 1, wherein the manager is able to cross all the databases of events, process requests for graphics and still refer to the Web Server that needs to provide these data in an organized way in the final reports.

25. A method for capturing parameters and registering events on a portable device with a digital television receiver, the method comprising:
    initializing a service of capturing parameters and register events on the portable device;
    providing a user's information in a SIM card (ICCID) and inserting the same in the event to be sent to a server, allowing the server to later compare the ICCID with a detailed record of the user;
    obtaining location information of the user in a time for the event computed in the service;
    collecting information about the intensity of TV signal, physical and logical channels at the time of the event collection and information access to electronic program guide (EPG) or searching for channels;
    storing the collected events in a queue ordered by event date;
    formatting the events to be saved in the queue for sending by encapsulating the events in accordance with the protocol DTVAM-DS;
    repeating the collecting information, storing the collected events, and formatting the events until the maximum size of 140 bytes of an SMS is reached or exceed a timeout of 10 minutes; and
    sending events encapsulated in an SMS class 2 message to the server transparent to the user's portable device,
    wherein, as events are sent to the server and the server confirms that data arrived intact, these data are excluded from a database.

26. The method of claim 25, wherein each and every event is always validated by the service previously stored in the database.

27. The method of claim 25, wherein sending of events occurs when the number of bytes in which event information is packaged is near, but not greater than 140 bytes or the timeout.

28. The method of claim 25, wherein the timeout is set to 10 minutes.

29. The method of claim 25, wherein the collecting information is used to obtain the phone country code (MCC) of the mobile network code (MNC) and the network identifier (Cell ID), in which the user was registered at the time of collection of the event, providing the user's location and the region at the time of collection.

30. The method of claim 25, wherein the collecting information provides the following information:
    the user answered "YES" in an activation message;
    the user answered "NEVER" in the activation message;
    the user activated an invitation message for activation;
    the user activated a menu;
    a TV is turned off;
    the TV is turned on;
    a channel is changed or a search of channels is initiated;
    the TV is tuned;
    the TV is not tuned;
    the TV signal is lost;
    the TV signal is recovered;
    results of searching channels is displayed;
    the electronic program guide (EPG) is accessed;
    the electronic program guide (EPG) is exited;
    remote configuration is recognized;
    an incoming call is initiated, and
    an incoming call is terminated.

31. The method of claim 25, wherein the collected event data is encapsulated within SMS messages sent in accordance with protocol DTVAM-DS, and the SMS messages are sent on specific ports, determined by the server, with the restriction that those ports are not already specified by standard SMS protocol.

32. The method of claim 25, wherein the SMS message is sent as Class 2 SMS, is not concatenated, and does not require confirmation of arrival at the server.

33. The method of claim 25, wherein the SMS message uses the bytes of data available for sending the SMS message encoded in 8 bits and is sent in binary form.

34. The method of claim 25, wherein the SMS, message is not sent in text form.

35. The method of claim 25, wherein once an event ends, another is attached to the end to maximize data space in the SMS message.

36. The method of claim 25, wherein if an event does not fit the end of the SMS message so that it has to be broken, the whole event then moves to a next message, and a current message is sent with a surplus in the data field.

37. The method of claim 25, wherein in the event of network failure, the events are stored on disk, so that the portable device is registered on a network again, all events are sent to the server.

38. The method of claim 25, wherein the crossing of the database is facilitated, processing requests for graphics and still referring to the Server that need to provide the data in an organized manner for final reports.

39. A portable device with a digital television receiver, the portable device comprising:
    a manager that manages and processes the logic of receiving, transmitting and validating events generated by a service and received within the portable device, analyzing the arrival of data, requesting data on all components to enable the assembly of the message to be sent, checking if an event is valid and initializing or ending all other components within the service for capturing events;
    a database which includes an event queue to be sent to a server;
    an interface to configure service parameters, in which all the preference parameters for both a user and the service parameters are configured;
    a SIM card interface to obtain user information on a SIM card (ICCID) and inserting the same in the event to be sent to the server;
    an interface of the portable device, through which it is obtained the location information of the user at the time for the event computed in the service;
    an interface TV circuit of the portable device to collect information about the intensity of TV signal, the physical and logical channels at the time of collection of event information, as well as access to electronic program guide (EPG) or search for channels;
    an SMS interface of the portable device in a port defined by the server, to send the events encapsulated in an SMS message to the server and receiving events for the configuration service for capturing parameters and registering events;
a queue to store the events received in a queue ordered by event date;
a formatter to format events to be saved in the queue to be sent by SMS channel, the events being encapsulated in accordance with the protocol DTVAM-DS;
an interface for application of SMS and MMS embedded in the portable device to receive and process commands from the server on a particular port, these commands being passed to the manager that processes and executes the commands remotely;
an interface for TV application, in which events are generated and forwarded to the manager that processes and validates whether an event is suitable for registration or for disposal;
a manager in the server to receive information records and events captured by the portable device and performs the management of the activity of remote configuration of service for capturing parameters and recording events in the portable device;
a radio channel interface through which the server exchanges SMS messages with the portable device;
an SMS interface in the server that validates the integrity of data and forwards the same to the manager;
a relational database capable of managing all event data captured by the manager and saved in the same, and
a Web Server to process the data of the relational database, such data and records of events being captured processed and consolidated by the manager to obtain desired audience data,
wherein, as events are sent to the server and the server confirms that the data arrived intact, these data are excluded from the relational database.

40. The portable device of claim 39, wherein each and every event is always validated by the service previously stored in the relational database.

41. The portable device of claim 39, wherein the sending of events occurs when the number of bytes in which event information is packaged is near, but is not greater than 140 bytes or a timeout limit.

42. The portable device of claim 41, wherein the timeout limit is set to 10 minutes.

43. The portable device of claim 39, wherein the interface of the portable device through which it is obtained the location information of the user is used to obtain the phone country code (MCC) of the mobile network code (MNC) and the network identifier (Cell ID), in which the user was registered at the time of collection of an event, providing the user's location and the region at the time of collection.

44. The portable device of claim 39, wherein the TV circuit interface provides the following information:
the user answered "YES" in an activation message;
the user answered "NEVER" in the activation message;
the user activated the device through an invitation message for activation;
the user activated via a menu system;
a TV is turned off;
the TV is turned on;
a channel is changed or a search of channels is initiated;
the TV is tuned;
the TV is not tuned;
the TV signal is lost;
the TV signal is recovered;
results of searching channels are displayed;
the electronic program guide (EPG) is accessed;
the electronic program guide (EPG) is exited;
remote configuration is recognized;
an incoming call is initiated, and
an incoming call is terminated.

45. The portable device of claim 39, wherein the SMS interface receives the SMS message, checks the class and port, if it is class 0 and the port is predefined in the system, then the information that is passed to the manager so that the parameters for capturing audience data are configured.

46. The portable device of claim 39, wherein the configuration parameters of data capture audience includes:
changing a value to show an activation message;
changing state of activation of the service for capturing audience data;
changing timeout to detect events in a specific category;
changing SMS address of the server; and
changing the value of accumulation period of system events.

47. The portable device of claim 39, wherein the queue sends to the relational database the current queue of events to be stored in file serving for redundancy in case of failures.

48. The portable device of claim 39, wherein the interface of application of SMS and MMS is responsible for processing the invitation SMS messages coming from the server, showing a special interface to the user when reading the invitation.

49. The portable device of claim 39, wherein special menus are added to a reading panel so that the user can accept direct from the manager to apply the service of capturing audience data without entering the TV application.

50. The portable device of claim 39, wherein the interface for TV application can also periodically show pop-ups inviting users to participate in the service for capturing audience data.

51. The portable device of claim 39, wherein a specific menu is provided so that the user can interact when he wants, and that enables or disables the service for data capture.

52. The portable device of claim 39, wherein such data collected through the TV application are encapsulated within SMS messages sent, and these SMS messages sent to specific ports, determined by the server, with the restriction that those ports are not already specified by standard SMS protocol.

53. A server comprising:
a manager that receives the information of records and events captured by a portable device and performs the management of the activity of remote configuration of service of capturing parameters and register of events in the portable device;
an interface radio channel through which the server exchanges SMS messages with the portable device;
an SMS interface embedded into the server that validates the integrity of data and forwards the same to the manager;
a database capable of managing all event data captured by the manager and saved in the same, and
a Web Server to process the data of the database, and such information and records of events captured processed and consolidated by the manager to obtain desired audience data,
wherein, as events are sent to the server and the server confirms that the data arrived intact, these validated data are excluded from the database, and
the manager is able to cross the database of events, process requests for graphics and still refer to the Web Server to provide data in an organized way in the final reports.

54. The server of claim 53, wherein in the case of sending an SMS class 0 message to the portable device, the SMS interface embedded in the server validates the information generated by the manager and packages it in accordance with the protocol DTVAM-DS.

\* \* \* \* \*

UNITED STATES PATENT AND TRADEMARK OFFICE
CERTIFICATE OF CORRECTION

PATENT NO. : 8,850,463 B2
APPLICATION NO. : 12/981623
DATED : September 30, 2014
INVENTOR(S) : Átila Leão Flores Xavier et al.

Page 1 of 1

It is certified that error appears in the above-identified patent and that said Letters Patent is hereby corrected as shown below:

In the Claims

Column 14, Line 22, In Claim 34, delete "SMS," and insert -- SMS --, therefor.

Signed and Sealed this
Seventh Day of April, 2015

Michelle K. Lee
*Director of the United States Patent and Trademark Office*